Dec. 31, 1940.　　　　O. A. PETERS　　　　2,227,272
PAINT SPRAY BOOTH
Filed March 13, 1939　　　2 Sheets-Sheet 1
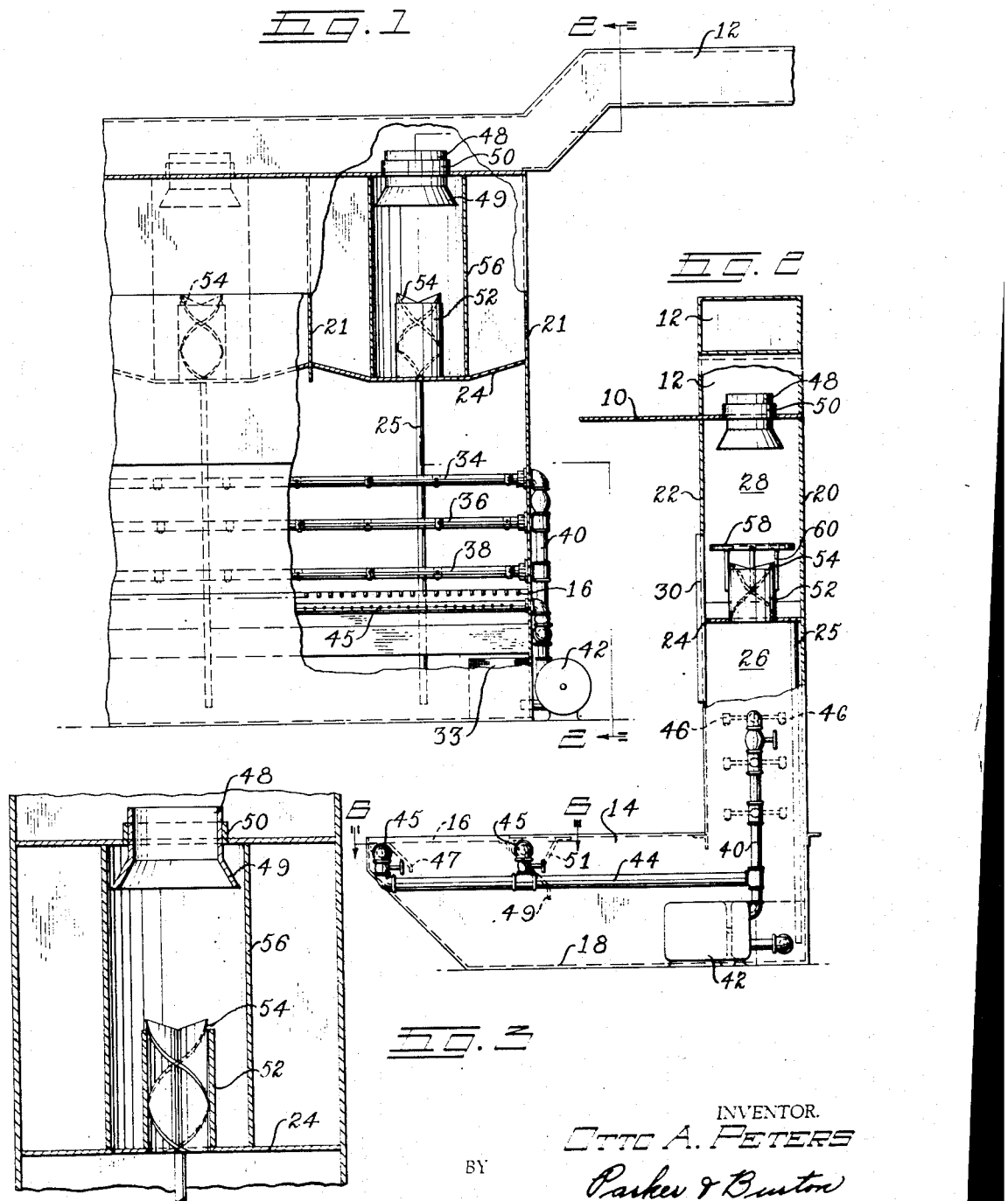
INVENTOR.
OTTO A. PETERS
BY Parker & Burton
ATTORNEYS.

Dec. 31, 1940.     O. A. PETERS     2,227,272
PAINT SPRAY BOOTH
Filed March 13, 1939     2 Sheets-Sheet 2
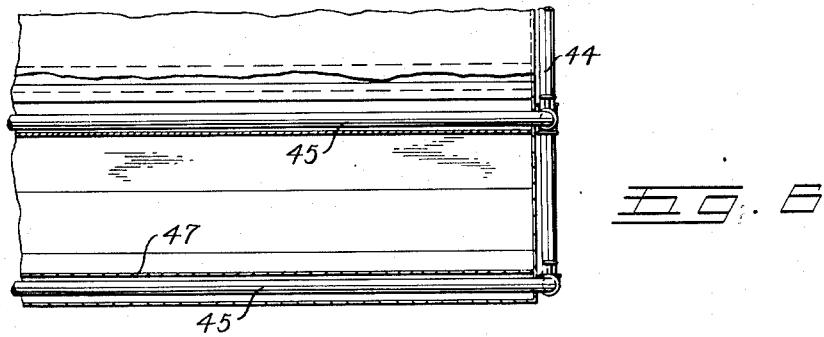
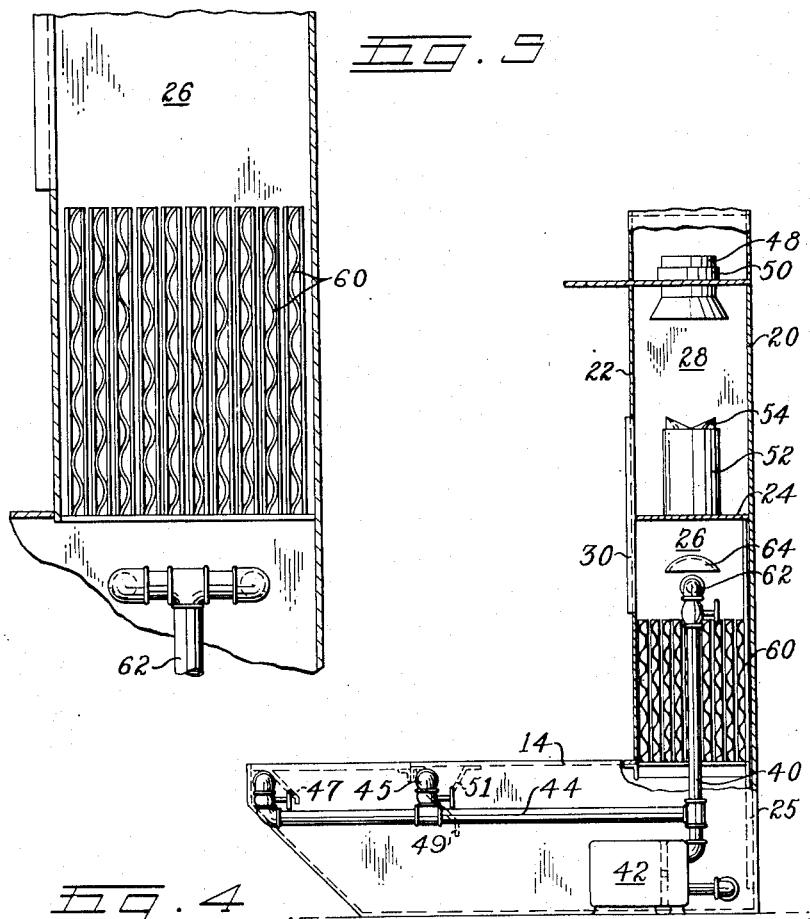
INVENTOR.
OTTO A. PETERS
BY
Parker & Burton
ATTORNEYS.

Patented Dec. 31, 1940

2,227,272

UNITED STATES PATENT OFFICE 2,227,272

PAINT SPRAY BOOTH

Otto A. Peters, Detroit, Mich., assignor to Industrial Sheet Metal Works, Inc., Detroit, Mich., a corporation of Michigan Application March 13, 1939, Serial No. 261,643

7 Claims. (Cl. 91—60)

This invention relates to improvements in wet spray booth construction and is here shown as embodied in a paint spray booth of this character.

An object is to provide an improved spray booth of the wet type which is simple and inexpensive in construction and efficient in operation. A further object is to provide such a booth wherein simple efficient means is employed for washing paint or other foreign material particles from the air and for eliminating such water particles from the air prior to the exhaust of the air from the booth.

Heretofore in wet spray booths of this type it has been the practice to spray the air stream drawn from the booth with water to knock down paint and other foreign particles therefrom and to collect such particles in a reservoir from which the useful material may be salvaged. Following the spraying of the air stream it was passed through water eliminators which were provided for the purpose of eliminating the water borne along by the air prior to the exhaust of the air from the booth.

These water eliminators commonly comprised a plurality of air deflectors or baffle elements which defined tortuous air passageways through which the water carrying air stream passed for exhaust. The water borne along on the air stream collected on these baffles and ran back into a water collector basin. Paint particles which had not been knocked down into the reservoir by the water spray and which were borne along by the air or the air borne water particles collected on these eliminators. Such paint particles as did not run back into the reservoir with the water from the eliminator elements remained thereon to clog up the elements. The removal of this collected paint from the eliminator baffles was exceedingly tedious, time consuming and costly. It added appreciably to the cost of operation of the paint spray booth.

It is the purpose of this invention to provide a wet spray booth of improved construction and adapted to eliminate from the air stream drawn from the booth the water which has been sprayed into such stream and to remove the paint and other foreign particles therefrom.

It is further an object to provide a construction which lends itself not only to efficient functioning in removing the paint and water from the airstream but which construction also lends itself to a simple cleaning operation of any paint that may have collected thereon.

Other objects, advantages and meritorious features of this invention will more fully appear from the following description, appended claims, and accompanying drawings, wherein:

Figure 1 is an elevation partly broken away of a paint spray booth embodying my invention, Fig. 2 is a vertical sectional view through a spray booth of the same general character as that shown in Fig. 1, but differing therefrom in detail as hereinafter set forth, Fig. 3 is an enlarged sectional view through the construction shown in Fig. 1, Fig. 4 is a vertical sectional view through a modified form of my spray booth, Fig. 5 is an enlarged vertical sectional view of a part of the structure shown in Fig. 4 slightly modified in detail, and Fig. 6 is a horizontal sectional view through the construction of Fig. 4 looking downwardly into the floor compartment.

The improvements in spray booth structure here described are shown in conjunction with a spray booth such as might be employed in the automobile industry for the paint spraying of automobile bodies. There is a double floor section and a double vertical wall section and in Fig. 2 a projecting roof part 10. As is well known, these booths are in the form of enclosures wherein there are end walls and side walls and bottom and top which limit the diffusion of paint contaminated air. Air is drawn from the interior of the booth through jacketed wall structures and exhausted through an air duct. Such exhaust air duct is here indicated as 12 in Figs. 1 and 2.

On the way through the provided air passageways the air is washed and cleaned and the water droplets are eliminated and as heretofore set forth the present invention concerns itself with improvements in means for cleaning the air and particularly for eliminating the water which has been sprayed into the air to wash out the paint particles. This improved type of water eliminating mechanism might be adapted to many varying types of spray booths.

It is understood that there are many kinds of booth structures. There are small booths in which small articles are painted and large ones which may be arranged in a double battery form and through which entire automobile bodies are carried; or the booths may not be paint spray booths but merely wet booths provided to clean or eliminate foreign material from air drawn therethrough through washing and cleaning such air.

In the particular construction here shown the upper floor wall 14 is provided with a grill structure 16 which serves as an intake for air drawn into the space below the wall 14 and between such wall and the lowermost floor wall 18. The air passes from such space into the passageway formed between the two rear walls 20 and 22. This air passageway between walls 20 and 22 is divided by a partition 24 into lower and upper compartments 26 and 28 respectively. Entrance to these compartments for removal and/or cleaning or parts located therein may be provided by a shiftable door or panel 30 as shown in Fig. 2.

Below the lower compartment 26 is located a liquid collector basin or receptacle wherein the water that is showered into the air stream going through the compartment 26 falls and is collected and from which the foreign particles such as paint may be removed. The basin is accessible for this purpose. This arrangement is not set forth in detail because it represents conventional practice.

Positioned within the lowermost compartment 26 is a water spray element which is here shown as embodying three horizontal spray pipes 34, 36 and 38, which horizontal pipes are fed from an upright lead 40 by means of a suitable pump 42 which pump may be driven from any suitable power source.

The horizontal extensions 34, 36 and 38 are provided with such number of nozzle elements 46 as may be desired. These nozzle elements are arranged in any manner thought desirable so as to shower a spray of water down on the air stream flowing upwardly through the lower chamber 26. The arrangement of the nozzles and the arrangement of the water spray mechanism may be in any desired fashion. Preferably it is a continuously circulating system of water and the intake to the pump 42 from the basin 32 may be provided with a screen 33 as in Fig. 1. The pump may be connected with a suitable source of supply so that clean water can be drawn in when desired.

There is a lead 44 which extends from lead 40 forwardly as shown in Fig. 2. This pipe 44 feeds horizontal spray pipes 45, two of which are shown in Fig. 2. These pipes are provided with spray outlets as shown in Fig. 1. They extend along under the floor 14 on opposite sides of the air inlet grill 16. A baffle wall 47 extends along the spray pipe 45 which is adjacent the outer sloping wall of the floor compartment and directs the water sprayed from such pipe against such sloping wall to flow down as a sheet thereover. Two baffle and drain plates 49 and 51 extend along opposite sides of the other spray pipe 45 which pipe 45 discharges its water onto plate 49 to flow thereover and fall as a sheet transversely across the air stream flowing through the floor compartment.

In Fig. 1 a series of these booths are shown arranged in a sort of a battery formation and the spray line may extend through these several booths. Exhaust air conduit 12 is provided with depending vertical conduits 48 which lead into the upper chambers 28 of these booths. Each of these conduits 48 may telescope within a fixed ring or sleeve section 50 so that it may be raised or lowered for a purpose to be hereinafter described.

A suitable suction fan not shown is employed to draw air outwardly through the conduit 12 which through the communicating ducts 48 exhausts the air from the upper chambers 28 and through the communication of such upper chambers with the lower chambers 26 draws air from such chambers. Each lower chamber communicates through the floor grill 16 with the interior of the booth to exhaust the air therefrom so that a stream of air is maintained through the upper and lower chambers and outwardly through the exhaust duct 12 such air being drawn from the interior of the booth.

The construction in Fig. 1 differs slightly from that in Fig. 2 as will be hereinafter set forth but the construction in Figs. 1 and 3 is alike. The partition 24 between the upper and lower compartments 28 and 26, respectively, has an opening therethrough within which is fixed a cylindrical conduit 52. Within this conduit 52 is fixed a helix 54. In the construction of Fig. 2 this helix has a half turn. In the construction of Figs. 1 and 3 the helix has a three quarter turn. As the air passes through the conduit 52 from the lower chamber 26 it is swirled by the helix so that when it leaves the conduit 52 under the influence of the helix it is thrown outwardly against the wall of the upper chamber 28.

In Fig. 2 the wall of the upper chamber is formed by the front and rear walls 22 and 20 and the side and partition walls 21 of the spray booth itself. In Figs. 1 and 3 there is an inner cylindrical wall structure 56 inserted within this space between the front and rear walls 22 and 20 and surrounding the communicating conduit 52 and forming the inner wall of the upper chamber proper. When this cylindrical member is used this upper chamber has an equal diameter in all directions. When it is omitted as in Fig. 2 it will be seen that the distance between the front and back wall is less than the distance laterally between the partition and side walls 21.

In either construction the air after being showered with water in the lower chamber 26 is drawn upwardly through conduit 52 and swirled out under the directing influence of the helix against the outer wall of the upper chamber. Whether such outer wall is formed by the cylindrical jacket 56 or the walls 20, 21 and 22, the water that is borne along by the air and thrown against the chamber wall drops down to the floor of the upper chamber or horizontal partition 24 and from there passes through drain 25 into the collector basin 32.

In the construction of Fig. 2 there is provided a crown baffle 58 which is supported by standards 60 from the conduit 52. This baffle is spaced above the conduit and helix and assists in directing the air outwardly against the side walls or rather it prevents the air from passing directly upwardly through the chamber 28 into the outlet conduit 48. This baffle, however, imposes a power load upon the exhaust fan and it has been found that if the helix is continued for another quarter turn (it is shown as having a half turn only in Fig. 2) and as illustrated in Figs. 1 and 3 the baffle may be omitted. In the construction of Figs. 1 and 3 the exhaust conduit 48 has a substantially greater cross sectional area than the cross sectional area of conduit 52. This difference in the two conduits lowers the velocity of the air after it swirls out of the helix to a rate of movement which allows the particles of foreign material and droplets of moisture to strike and remain on the walls of the upper chamber. If the air moves too rapidly it will carry the foreign material and water particles out through discharge conduit 48. The cross section areas of the two conduits are so designed that the velocity of the air is slowed down to the proper rate for removing the particles and water droplets from the air. The conduit section 48 is also vertically adjustable within the ring 50 toward or away from conduit 52 to increase or decrease the distance between the discharge outlet of air from the conduit 52 and its entrance into conduit 48. Preferably this conduit 48 has a flaring intake 49 as shown.

The construction shown in Figs. 4, 5 and 6 resembles that shown in Figs. 1, 2 and 3 except that the horizontal water shower pipes 34, 36, and 38 which are shown in Figs. 1 and 2 as positioned in the lower chamber 26 have been eliminated and there has been substituted therefor a stack or plurality of substantially parallel corrugated water feed plates 60 which are supported in the lower compartment as shown in Figs. 4 and 5. The air that is drawn through the booth must pass through this lower compartment and between the corrugated plates upwardly into the upper compartment 28. Structural parts of this booth shown in Figs. 4, 5 and 6 which are similar to corresponding structural parts shown in the booth of Figs. 1, 2 and 3 bear identical numerals.

In Fig. 4 there is shown a lead pipe 40 which extends from the pump 42 and terminates in a horizontal extension 62 which extension 62 is provided with upwardly pointing nozzles or water outlet openings through which water is thrown upwardly against the underside of an impingement plate 64 to fall back therefrom onto the stack of plates 60 to flow down therethrough counter the air stream flowing upwardly therethrough. The water thus showered down onto the stack of corrugated plates from the impingement baffle plate 64 flows down over the surface of these corrugated plates and the air flowing between such plates is substantially cleaned of any foreign particles such as paint which may be carried along thereby.

The construction of Fig. 5 differs slightly from that of Fig. 4 in that in this figure the water discharge pipe 62 is positioned below the corrugated plates 60 and the water is thrown upwardly against the lower end of such corrugated plates and in this figure the discharging pipe 62 is shown as being provided in two sections so as to wet completely the lower end of the stack of corrugated plates. In this structure such water is carried up into the stack of plates by the upwardly flowing stream of air.

In the operation of the spray booth the air which is drawn from the interior of the booth passes through the floor chamber where it may be showered with water discharged from pipes 45. Such air strikes the water sheet flowing over the sloping end of the floor compartment. The air stream passes through the water curtain falling from baffle 49 into the floor compartment and up through the lower chamber 26 between the upright walls where it is sprayed with water as hereinabove described in connection with the structures of Figs. 1 and 2 or caused to pass over water fed plates as shown in Figs. 4 and 5.

From there it is drawn through conduit 52 and swirling currents are set up therein which causes it to be directed outwardly against the inner surface of the wall of the upper chamber 28 whether the same is formed by the side walls 20, 21 and 22 or by the cylindrical jacket 56 so that the water borne along with the air falls down and passes through the drain pipe 25 into the collector basin. With this water also passes the paint particles carried thereby and that have not been knocked down by the water spray in chamber 26, so that the air which passes through the exits 48 into the main exhaust conduit 12 is substantially free from moisture particles and paint or the like.

If it is required to clean the surfaces of paint which may have collected thereon the helix is so fitted into the conduit 52 that it can be easily removed and due to its character its surfaces are easily cleaned. The walls of such chamber may also be readily cleaned. The entrance door 30 to such chamber may be of such size to permit removal of cylindrical shroud 56 for cleaning.

What I claim is:

1. A spray booth having walls spaced apart forming an air passageway divided into communicating upper and lower chambers, said lower chamber communicating with the interior of the booth to draw air therefrom, an air exhaust conduit communicating with the upper chamber to draw air therefrom, an air communicating conduit between the upper and lower chambers having an air directing helix positioned therein adapted to direct the air flowing therethrough against the interior of the wall of the upper chamber, a stack of corrugated substantially parallel plates positioned within said lower chamber and spaced apart forming air passageways through which the air flowing through the lower chamber must pass to enter the upper chamber and water distributing mechanism disposed to shower water against one end of the said stack of plates.

2. A spray booth of the character described having spaced apart upright walls, a partition separating the space between said walls into upper and lower chambers, a communicating air conduit through said partition, an exhaust air conduit communicating with the upper chamber to draw air therefrom and through said communicating air conduit from the lower chamber, said exhaust air conduit having a cross sectional area substantially in excess of the cross sectional area of the communicating air conduit, a helix positioned within said communicating air conduit adapted to direct the air flow therethrough from the lower chamber outwardly against the wall of the upper chamber, a stack of corrugated substantially parallel vertically disposed plates positioned within said lower chamber and spaced apart forming air passageways through which the air flowing through the lower chamber must pass to enter the upper chamber, water distributing mechanism adapted to direct a shower of water against the lower end of said stack of plates to be carried with the air stream upwardly thereinto.

3. A spray booth of the character described having spaced apart upright walls, a partition separating the space between said walls into upper and lower chambers, a communicating air conduit through said partition, an exhaust air conduit communicating with the upper chamber to draw air therefrom and through said communicating air conduit from the lower chamber, said exhaust air conduit having a cross sectional area substantially in excess of the cross sectional area of the communicating air conduit, a helix positioned within said communicating air conduit adapted to direct the air flow therethrough from the lower chamber outwardly against the wall of the upper chamber, a stack of corrugated substantially parallel plates positioned within said lower chamber and spaced apart forming air passageways through which the air flowing through the lower chamber must pass to enter the upper chamber, water distributing mechanism adapted to distribute the water over the upper end of said stack of plates to flow down therethrough counter the air stream passing upwardly through the plates with a reservoir adapted to collect water flowing from the said stack of plates.

4. A spray booth having spaced apart floor walls and spaced apart side walls, the space between said floor walls and side walls forming a communicating air passageway communicating through one floor wall with the interior of the booth to draw air therefrom, the space between said side walls being divided into communicating upper and lower chambers, said lower chamber communicating with the floor compartment to receive air therefrom, an air exhaust conduit communicating with the upper chamber to draw air therefrom, an air communicating conduit between the upper and lower chambers having an air directing helix positioned therein adapted to direct the air passing upwardly therethrough from the lower chamber against the interior of the wall of the upper chamber, water distributing mechanism disposed within said floor compartment including a spray pipe extending transversely thereacross and a drain plate extending lengthwise of said pipe and over which water is flowed from the pipe to discharge therefrom as a curtain extending transversely across the air stream flowing through said floor compartment, water distributing mechanism adapted to discharge water into the air flowing through the lower chamber, a water reservoir adapted to collect said water, and a water drain leading from the upper chamber into said reservoir.

5. A spray booth having spaced apart floor walls and spaced apart side walls, the space between said floor walls and side walls forming a communicating air passageway communicating through one floor wall with the interior of the booth to draw air therefrom, the space between said side walls being divided into communicating upper and lower chambers, said lower chamber communicating with the floor compartment to receive air therefrom, water spray mechanism adapted to direct a water spray into the air passing through the lower chamber, a water reservoir adapted to collect said spray water, an air communicating conduit between the upper and lower chambers, water eliminator means in the form of an air directing helix positioned within said communicating conduit adapted to direct the air passing upwardly therethrough from the lower chamber against the interior of the wall of the upper chamber, an air exhaust conduit extending through the top of said upper chamber substantially in alignment with said air communicating conduit, and means mounting said exhaust conduit for movement either toward or away from said air communicating conduit.

6. A spray booth of the character described having spaced apart upright walls, a partition separating the space between said walls into upper and lower chambers, water spray mechanism positioned within the lower chamber, and a water collector adapted to receive the spray water discharged into the lower chamber, a communicating air conduit through said partition projecting upwardly into the interior of the upper chamber, an exhaust air conduit communicating with the upper chamber and projecting downwardly thereinto and adapted to draw air therefrom and through said communicating air conduit from the lower chamber, one of said conduits being vertically adjustable toward and away from the other, water eliminator means in the form of a helix positioned within the communicating air conduit through said partition adapted to direct the air flowing therethrough from the lower chamber outwardly against the wall of the upper chamber.

7. A wet spray booth of the character described having walls spaced apart forming an air passageway divided into communicating upper and lower chambers, said lower chamber communicating with the interior of the booth to draw air therefrom, an air exhaust conduit communicating with the upper chamber to draw air therefrom, mechanism adapted to supply water to the air passing through the lower chamber, and an air communicating conduit between the upper and lower chambers having an air directing helix positioned therein for imparting a centrifugal swirling movement to air flowing therethrough from the lower chamber against the interior of the wall of the upper chamber, said exhaust conduit that leads away from the upper chamber having a cross-sectional area substantially greater than the cross-sectional area of the air communicating conduit between the upper and lower chambers, the substantial difference in cross-sectional area of the two conduits acting to decrease the velocity of the air in the upper chamber so that particles in suspension in the air stream can collect on the walls of the upper chamber and thus be removed from the air stream.

OTTO A. PETERS.